(12) United States Patent  (10) Patent No.: US 7,032,629 B1
Mattingly et al.  (45) Date of Patent: *Apr. 25, 2006

(54) METHOD AND SYSTEM FOR BLENDING GASOLINE AND BUTANE AT THE POINT OF DISTRIBUTION

(75) Inventors: Larry D. Mattingly, Sanford, FL (US); Steven M. Vanderbur, Houston, TX (US)

(73) Assignee: MCE Blending, LLC, Sanford, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/759,515

(22) Filed: Jan. 16, 2004

Related U.S. Application Data

(63) Continuation of application No. 10/071,191, filed on Feb. 8, 2002, now Pat. No. 6,679,302.

(60) Provisional application No. 60/267,844, filed on Feb. 9, 2001.

(51) Int. Cl.
  *B65B 1/04*  (2006.01)
(52) U.S. Cl. .............................. 141/9; 141/104; 141/83; 137/486; 137/625.41
(58) Field of Classification Search .................... 141/9, 141/100, 104, 94, 83, 192, 198; 222/25, 222/26, 71, 72; 137/486, 625.41
See application file for complete search history.

(56) References Cited

U.S. PATENT DOCUMENTS

| | | | |
|---|---|---|---|
| 3,751,644 | A | 8/1973 | Mayer |
| 3,813,925 | A | 6/1974 | Fenske et al. |
| 3,904,508 | A | 9/1975 | Whyte et al. |
| 3,999,959 | A | 12/1976 | Bajek |
| 4,268,701 | A | 5/1981 | Dang Vu et al. |
| 5,004,850 | A | 4/1991 | Wilson |
| 5,093,533 | A | 3/1992 | Wilson |
| 5,208,402 | A | 5/1993 | Wilson |
| 5,423,607 | A | 6/1995 | Jones et al. |
| 5,823,669 | A | 10/1998 | Jones |
| 5,860,457 | A | 1/1999 | Andersson |
| 5,975,353 | A | 11/1999 | Finlayson |
| 5,979,705 | A | 11/1999 | Kaehler et al. |

*Primary Examiner*—Steven O. Douglas
(74) *Attorney, Agent, or Firm*—King & Spalding LLP; Clark G. Sullivan; Shaun B. Sethna

(57) ABSTRACT

A system and method is provided for blending butane with gasoline at petroleum tank farms, immediately before distribution to tanker trucks. The invention provides a method for blending gasoline and butane at a tank farm comprising: (a) drawing a gasoline stream from a tank of gasoline; (b) drawing a butane stream from a tank of butane; (c) blending the butane and gasoline streams to form a blend; and (d) dispensing the blend. The blending process can be controlled to ensure that the vapor pressure of the blended gasoline meets vapor pressure requirements of environmental regulations. Information generated by the blending process can be used to efficiently forecast butane purchasing requirements, and to generate regulatory reports.

33 Claims, 5 Drawing Sheets

BLENDING ARCHITECTURE OVERVIEW

METHOD AND SYSTEM FOR BLENDING GASOLINE AND BUTANE AT THE POINT OF DISTRIBUTION

RELATED APPLICATION

The present application claims priority to U.S. provisional application entitled "Method and System for Blending Gasoline and Butane at the Point of Distribution," filed on Feb. 9, 2001, having Ser. No. 60/267,844.

The present application is a continuation of and claims priority to U.S. application entitled Method and System for Blending Gasoline and Butane at the Point of Distribution, filed Feb. 8, 2002, having Ser. No. 10/71,191, now U.S. Pat. No. 6,679,302.

TECHNICAL FIELD

The present invention generally relates to blending gasoline and butane at gasoline tank farms. More specifically, it allows for simple and accurate blending of gasoline and butane at the point of distribution, based upon the volatility of the gasoline before blending, and a prescribed level of volatility after blending.

BACKGROUND OF THE INVENTION

Gasoline distribution systems typically rely upon pipelines to deliver gasoline from refineries to tank farms. At the tank farms gasoline is stored until it is dispensed to gasoline tanker trucks. The tanker trucks deliver the gasoline to retail gasoline stations and other dispensing outlets where the gasoline is eventually delivered to an automobile, truck, or other vehicle.

A significant physical property of gasoline is its volatility, or its ability to combust. There are two principle methods for assessing the volatility of gasoline: (1) measuring the vapor-liquid ratio, and (2) measuring the vapor pressure. The Reid method is the standard test for measuring the vapor pressure of petroleum products. Reid vapor pressure (sometimes "RVP") is related to true vapor pressure, but is a more accurate assessment for petroleum products because it considers sample vaporization as well as the presence of water vapor and air in the measuring chamber. The Reid vapor pressure of gasoline affects the ease with which gasoline is combusted, and can have a significant impact on the ease with which an automobile engine is started, especially during colder seasons when the temperature of gasoline and its corresponding volatility decreases.

In order to keep cars performing at a consistent level year-round, gasoline marketers blend agents with gasoline that increase the Reid vapor pressure and volatility of the gasoline. Butane is commonly added as a RVP modifying agent during colder months because it is more volatile than gasoline. It is also added to reduce the cost of gasoline, because it is generally less expensive than gasoline bought at the wholesale level.

The United States Environmental Protection Agency (EPA) is concerned with gasoline vapor pressure because gasoline vapor emissions from automobiles are a major component of VOC's (volatile organic compounds) in the atmosphere. Gasoline vapor emissions are of particular concern during the warmer months when gasoline is more volatile. Accordingly, the EPA has promulgated a number of regulations that govern the volatility of gasoline, and how much butane can be blended with gasoline during May 1 through September 15. For each occasion that butane is blended with gasoline during this time period, the EPA requires that the mixture be certified to ensure that it is within the volatility guidelines.

Butane has historically been blended with gasoline at several points in the gasoline distribution chain. The first opportunity to blend butane with gasoline is at the refinery, before pipelines transport the gasoline to tank farms. Refineries often add butane at the trunk line in response to changes in Reid vapor pressure demand. This process is imprecise, however, because the blended gasoline is subsequently mixed in the pipeline with other sources of gasoline of varying Reid vapor pressure. Moreover, because gasoline pipelines serve multiple regions that have variable RVP requirements, the refinery can only modify the gasoline to the lowest maximum RVP allowed by the EPA across the various regions served by the pipeline.

Butane is also added to gasoline while it is transported in the pipeline, after consolidation of various trunk lines from refineries. Typically, butane will be added to a certain volume of gasoline with a constant volatility. However, it is difficult to perform blending in the pipeline with any measure of precision. The rates of flow within the pipelines and the Reid vapor pressure of a certain volume of gasoline within the pipeline vary considerably. An additional difficulty is that the pipeline must be physically breached in at least two locations to sample the gasoline, and to add butane to the flow of gasoline. Breaching a high volume gasoline pipeline carries with it large risks that most pipeline operations would prefer to avoid.

The third point of blending is at the tank farm. When delivery of gasoline is made to a large storage tank, the RVP of the tank is measured, and sufficient butane is added to the tank to attain a desired RVP. Because tanks farms generally service a smaller area than an entire pipeline, blending at the tank farm can be more narrowly tailored to the RVP requirements of a particular region. Blending in tanks at the tank farm is performed with existing valves in tanks to introduce the butane, and thus does not entail risks similar to butane blending during gasoline transport through a pipeline.

However, blending butane at tank farms is not without its complications. Each time that gasoline is introduced to a tank, the RVP must again be measured, and butane must be added to the tank to attain a desired RVP. Often, gasoline will be dispensed to several tanker trucks before the butane can be blended, thus losing the opportunity to blend butane in those shipments. Moreover, blending butane in tanks is labor intensive and imprecise. Because the RVP of gasoline varies within a tank, several measurements must be taken throughout the tank, and considerable stirring must occur to maximize homogeneity.

All of the foregoing methods suffer from a substantial degree of imprecision. In view of this imprecision, gasoline suppliers are unable to maximize the amount of butane blended with gasoline. In particular, during summer months, government regulations currently require recertifying of gasoline each time butane is blended. The cost of this additional certification vitiates gains that could be achieved with additional blending at the tank farm.

Several methods have been attempted to improve the precision of butane blending and the predictability of Reid vapor pressure in the final product. The Grabner unit is a substantial advance in this respect. The Grabner unit (manufactured by Grabner Instruments) is a measuring device capable of providing Reid vapor pressure and liquid-vapor ratio data for a gasoline sample typically within 6–11 minutes of introducing the sample to the unit. It has been employed at some refineries to consistently measure the volatility of gasoline, and to blend butane with the gasoline based upon an allowable RVP for the gasoline. There are also other commercially available instruments for assessing the volatility of gasoline.

Although the Grabner unit can provide more accurate assessments of gasoline volatility at the refinery, a need exists for precise measurements at the final distribution point, which is the tank farm. As explained above, the current method of taking several measurements from a large gasoline tank at the tank farm is labor intensive and must be done repeatedly because of new gasoline being introduced into the tank. A further need exists in that tank farm distributors must constantly adjust their butane blending throughout the year in response to changes in temperature and concomitant changes in EPA allowable RVP levels. Finally, a need exists for the ability to blend butane with reformulated gasoline more accurately.

SUMMARY OF THE INVENTION

The present invention is a system and method for blending butane with gasoline at the tank farm, immediately before the gasoline is dispensed to a tanker truck. The blending occurs downstream of the gasoline and butane storage tanks on the tank farm, after the gasoline and butane are drawn from their storage tanks for dispensing into a tanker truck, but before the gasoline is actually dispensed to the tanker truck at the rack. The apparatus for blending the butane and gasoline is any conventional Y-type or T-type juncture capable of joining two fluid flows into one. The ratio of gasoline and butane blended by the blending apparatus can be varied to achieve any desired vapor pressure or vapor/liquid ratio in the gasoline dispensed to the tanker truck.

The blending apparatus is preferably under the continuous control of a process control unit, which can vary the ratio at which gasoline and butane are blended to attain a desired vapor pressure or vapor/liquid ratio. The process control unit determines the blending ratio based upon three pieces of data: (1) the vapor pressure of gasoline entering the blending unit, (2) the vapor pressure of butane entering the blending unit, and (3) the desired vapor pressure of the blended gasoline. Alternatively, or additionally, the process control unit can determine the blending ratio based upon (1) the vapor/liquid ratio of the gasoline, (2) the vapor pressure of butane entering the blending unit, and (3) the desired vapor/liquid ratio of the gasoline. In a preferred embodiment, the process control unit determines the blending ratio from the vapor pressure and vapor/liquid ratio assessments, adopting the lowest rate of butane blending from the two methods.

By blending gasoline and butane immediately before the gasoline is dispensed to a tanker truck, and by continuously controlling the ratio of gasoline and butane blended by the blending apparatus, a number of significant advantages are attained, including the following:

1. The amount of butane blended with the gasoline can be more thoroughly controlled, yielding less RVP variability among tanker truck shipments.
2. The butane and gasoline can be blended to yield consistent optimal performance of motor vehicles that employ the blended gasoline, regardless of the time of year in which the motor vehicle is operated, or the temperature or elevation at which such motor vehicle is operated.
3. The ratio of butane and gasoline blended can be easily varied and controlled to comply with regional and/or seasonal RVP requirements imposed by EPA or state regulations upon the sale of retail gasoline.
4. By continuously adding butane to gasoline dispensed to tanker trucks, and by continuously blending at the maximum RVP and vapor/liquid ratio allowable by law, tank farm operators are able to maximize the amounts of butane that they blend with gasoline, and minimize their cost basis for the gasoline sold.

The data required for the process control unit to properly blend butane and gasoline to prescribed conditions, especially fluid flow rates, can also be used to generate useful operational data. For example, by monitoring the rate at which butane is drawn from a butane storage tank, one is better able to predict when butane must next be purchased, and how much butane must be purchased, thereby ensuring better informed butane purchasing decisions. Moreover, by properly manipulating the data obtained from the blending process control unit, one is able to generate reports for gasoline sold from a particular tank farm as required by federal and state laws or regulations.

These and other objects, features, and advantages of the present invention may be more clearly understood and appreciated from a review of the following detailed description of the disclosed embodiments and by reference to the appended drawings and claims.

DETAILED DESCRIPTION OF THE EXEMPLARY EMBODIMENTS

Figure 1:
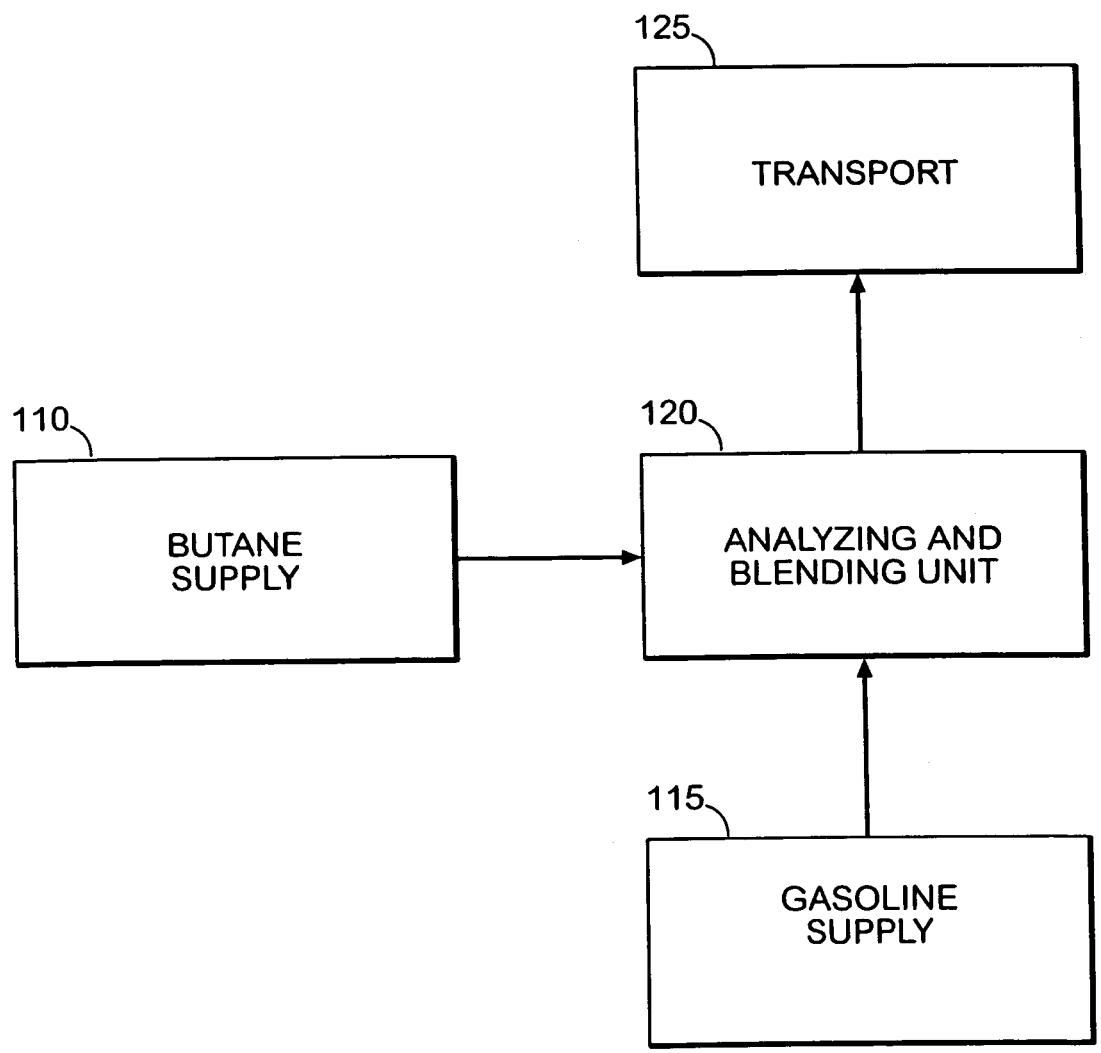
FIG. 1 is a functional block diagram illustrating an overview of the architecture of an exemplary butane blending system.

In one embodiment the invention provides a system for blending gasoline and butane at a tank farm comprising: (a) a tank of gasoline; (b) a tank of butane; (c) a blending unit downstream of and in fluid connection with the tank of gasoline and the tank of butane; and (d) a dispensing unit downstream of and in fluid connection with the blending unit. In another embodiment the invention provides a method for blending gasoline and butane at a tank farm comprising: (a) drawing a gasoline stream from a tank of gasoline; (b) drawing a butane stream from a tank of butane; (c) blending the butane and gasoline streams to form a blend; and (d) dispensing the blend.

Tank farms can be readily adapted or constructed to contain the system, or to carry out the method, simply by modifying their piping systems to integrate a blending unit between an existing gasoline tank and an existing dispensing unit. Also, because most tank farms do not already contain a butane tank, one or more of such tanks will need to be added.

The term "tank farm" is meant to encompass any facility that contains a number of large storage tanks for petroleum products, from which petroleum tanker trucks are filled. Such facilities typically contain multiple storage tanks that separately contain various types and grades of gasoline, including reformulated gasoline as that term is typically used in the gasoline business, and the various grades of reformulated gasoline. The tanks may also contain more specialized petroleum products. Each of these various types and grades of gasoline and specialized petroleum products, is capable of being blended according to the present invention, and is thus encompassed within the term "gasoline." The term butane includes n-butane, isobutane, and commercially available butane in the presence of like-fraction hydrocarbons.

The tanks often hold in excess of 500,000 gallons of petroleum product, and are surrounded by berms to capture any petroleum spills. Such facilities typically receive their petroleum products from petroleum pipelines that consolidate refined petroleum products from a number of refinery trunk lines, although tank farms can also be supplied only from one refinery, or from a coastal or freshwater port that receives refined petroleum products by boat. As used herein, the term "tank farm" only includes tank farms that distribute petroleum products to petroleum tanker trucks.

The dispensing unit can be any type of unit that is adapted for dispensing petroleum products to conventional receptacles mounted on petroleum tanker trucks. One typical dispensing unit is called a "rack" and is located on the tank farm. The dispensing unit can comprise several outlet ports to which different transports may be coupled. Generally, a transport driver connects the transport to the dispensing unit and selects the desired grade of gasoline. The selection of gasoline initiates the blending process. In the description that follows, gasoline can include gasoline, as well as other types of refined petroleum products such as diesel and jet fuel.

The blending unit can be any conventional apparatus that achieves blending of two or more separate streams into one. For example, the unit can be a Y-type or T-type junction that consolidates two independent streams. Alternatively, the blending unit can be an injector, which selectively injects butane into a gasoline stream.

The ratio at which the gasoline and butane streams are blended can be controlled at a variety of points along the path of travel for the gasoline and butane, using a variety of methods. In the injection method discussed above, the ratio can be controlled simply by varying the rate at which butane is injected into a gasoline stream flowing at a substantially constant rate. Alternatively, the ratio can be controlled by varying the rate at which gasoline and/or butane is supplied to the blending unit. The rate can be controlled by adjusting valves located between the tank and the blending unit, or by varying the output of pumps that control the flow of butane and/or gasoline to the blending unit.

In the description of the embodiments of the invention and the claims that follow, measuring the vapor pressure will refer generally to the volatility of the gasoline or butane. Indeed, the term vapor pressure is meant to encompass both Reid vapor pressure as measured by applicable ASTM procedures, and other measures of vapor pressure such as true vapor pressure and vapor/liquid ratio. It should be understood that vapor pressure measurements can also include a measurement of the vapor-liquid ratio at a certain temperature. In certain embodiments of the present invention measurements may be taken for both vapor pressure and vapor-liquid ratio. Furthermore, the vapor pressure measurement can include other methods for assessing the volatility of either the gasoline, or the butane, or both. A variety of instruments may be used for assessing the volatility of the gasoline and butane. The Grabner instrument is one such instrument which is discussed herein. The terms sensor and analyzer can be used to generally refer to the instrument that is measuring the volatility of the gasoline or butane.

In a preferred embodiment the gasoline and butane are blended by a variable ratio blending unit, in which the ratio of gasoline and butane is controlled and/or varied by any of the foregoing mechanisms. In a particularly preferred embodiment, the gasoline and butane are blended at a ratio which is selected to attain a prescribed vapor pressure in the blended product. The prescribed vapor pressure can be based upon many considerations, including the maximum vapor pressures allowable by federal or state regulations for a particular region at a particular time of year, or to maximize automobile performance in view of the regional climate and elevation.

The variable ratio blending unit is preferably under the separate control of a process control unit, which dictates and controls the ratio at which butane and gasoline are blended based upon the prescribed vapor pressure. The process control unit receives measurements of the vapor pressure of the butane and gasoline, and from those measurements calculates the ratio at which the butane and gasoline should be blended to achieve the prescribed vapor pressure. Based upon those calculations, the process control unit emits a ratio input signal that controls the ratio of butane and gasoline blended by the blending unit.

Thus, in one embodiment, the system comprises a process control unit, wherein the process control unit generates a ratio input signal that controls the ratio of butane and gasoline blended by the blending unit. In still another embodiment the ratio input signal is derived from a calculation of the ratio of butane and gasoline that will yield a desired vapor pressure.

Numerous methods exist for calculating the ratio at which butane and gasoline should be mixed to attain the prescribed vapor pressure. In addition, there are a number of methods for describing the vapor pressure of a liquid. The most common way for measuring the vapor pressure of petroleum products is the Reid vapor pressure (sometimes "RVP") test. The most common test for RVP of petroleum fractions is defined by the American Society for Testing and Materials under the designation ASTM 5191. The American Petroleum Institute describes a predecessor RVP test procedure (ASTM D323-56) in detail, including suitable apparatus for such measurements, in "Measuring, Sampling, and Testing Crude Oil," Bulletin 2500, API, New York, January 1955, the disclosure from which being hereby incorporated by reference as if fully set forth herein. Other American Petroleum Institute Publications show charts relating RVP and ASTM boiling characteristics of gasolines and crude oils to true vapor pressure, a way to estimate the RVP of blends, and the relation of RVP to evaporation losses. See, e.g., American Petroleum Institute, Bulletin 2513, API, New York 1959; American Petroleum Institute Bulletin 2516, API, New York, March 1962; American Petroleum Institute Bulletin 2518, API, New York, June 1962.

Recently, ASTM D 6378 was published as a standard for measuring vapor pressure of gasoline by double injection or triple expansion. Measurements by this standard can be made by instruments manufactured by Grabner Instruments, Vienna, Australia, under the trade name Minivap, with the Minivap On-line being particularly suitable for applications of the present invention. There are also other commercially available instruments for measuring the volatility of petroleum products which could be used with this invention.

The blend ratio of butane to gasoline required to attain a prescribed vapor pressure can be determined simply by direct volumetric averaging of the RVP of the butane and gasoline. However, it has been noted in the literature that volumetric averaging can yield low estimates of resultant RVP, especially when the amount of butane added is less than 25%. Methods for determining blend ratios to attain a prescribed Reid vapor pressure, which overcome these observed limitations on volumetric averaging, are set forth more fully in "How to Estimate Reid Vapor Pressure (RVP) of Blends," J. Vazquez-Esparragoza, Hydrocarbon Processing, August 1992; and "Predict RVP of Blends Accurately," W. E. Stewart, Petroleum Refiner, June 1959; and "Front-End Volatility of Gasoline Blends," N. B. Haskell et al., Industrial and Engineering Chemistry, February 1942, the disclosure from each being hereby incorporated by reference as if fully set forth herein. Moreover, it should be noted that the system of the present invention can be modified to periodically sample the RVP of the resultant blend for quality control, when quality control is of concern.

To calculate the blend ratio one must first have knowledge of the respective vapor pressures of the gasoline and butane streams. Therefore, the vapor pressures of the gasoline and butane streams are preferably measured in order to generate the data used in the blending ratio calculation. The measurement can be carried out in a number of ways. Because of the variability in vapor pressure of gasoline (due to the varying composition of gasoline delivered through pipelines) and butane (due to the difference in vapor pressure of n-butane and isobutane), the vapor pressure is preferably measured directly, by a unit specifically designed to make such measurements from samples of gasoline and butane. One such unit is the Minivap Online analyzer manufactured by Grabner Instruments (Vienna, Austria).

As mentioned, the Grabner unit performs its analysis of vapor pressure based upon samples of the gasoline and/or butane. Samples of the gasoline and butane can be drawn from the system at any point upstream of the point where butane and gasoline are physically mixed. However, the samples are preferably drawn from the butane and/or gasoline stream after such butane and/or gasoline has been drawn from the storage tanks, because of the lack of product uniformity within these large tanks.

Therefore, in one embodiment the system further comprises a butane vapor pressure sensor for measuring the vapor pressure of butane upstream of the blending unit, and a gasoline vapor pressure sensor for measuring the vapor pressure of gasoline upstream of the blending unit, wherein the ratio input signal is generated from the vapor pressures of gasoline and butane measured by the sensors. In a preferred embodiment the gasoline and butane vapor pressure sensors appear almost as one unit with the blending unit, and measure the vapor pressure of gasoline and butane within the blending unit immediately before blending. In one particular embodiment, the vapor pressures of the gasoline and butane are determined by: (a) drawing a sample of gasoline from the gasoline stream; (b) measuring the vapor pressure of the sample of gasoline; (c) returning the sample of gasoline to the gasoline stream; (d) drawing a sample of butane from the butane stream; (e) measuring the vapor pressure of the sample of butane; and (f) returning the sample of butane to the gasoline stream.

As mentioned above, the vapor pressure of gasoline within a large tank can vary considerably over time. It is therefore necessary to monitor the vapor pressure of the gasoline and butane streams with some degree of frequency. The vapor pressure need not be measured continuously because the vapor pressure of the gasoline can be expected to remain substantially constant over short periods of time. To assure good uniformity in the butane/gasoline blend, it has been found desirable generally to measure a substantially continuous stream of gasoline about every 6 to 15 minutes (pumping at conventional rates for dispensing gasoline to tanker trucks). Whenever such measurements are made, the process control unit receives the measurements, recalculates the ratio at which the butane and gasoline must be blended to attain the prescribed vapor pressure, and varies the ratio of butane and gasoline blended through the applicable control mechanism.

Thus, in still another embodiment, the invention provides a process control unit that comprises one or more information processing units capable of transforming measurements from the gasoline and butane vapor pressure sensors into the ratio input signal, and maintaining or varying the ratio of gasoline and butane blended in the blending unit. In one embodiment the step of determining the blend ratio comprises: (a) setting a predetermined value for the vapor pressure of the blend, and transmitting that value to a processing unit; (b) transmitting the gasoline and butane vapor pressures to a processing unit; (c) calculating the blend ratio from the gasoline and butane vapor pressures and the predetermined value. A signal that corresponds to the blend ratio from the processing unit is then preferably transmitted to a programmable logic control, which adjusts the ratio of butane and gasoline blended in the blending unit.

The level of information control over the butane blending process of this invention offers substantial opportunities to improve the efficiencies associated with butane purchasing decisions. The timing of butane purchases is a critical element of any butane purchasing program given the variability in spot and futures prices of butane on the commodities markets. The present invention offers the opportunity to accurately and efficiently project butane purchasing needs from the butane consumption data from a butane blending process at a tank farm. Because the consumption of butane will vary over time due to a number of factors, the projections can be made even more accurate by taking into consideration the factors that cause these consumption rates to vary.

For example, environmental regulations dictate allowable Reid vapor pressure for gasoline sold from tank farms at various times of the year, and for various regions. The allowable Reid vapor pressure is, of course, a determining factor when calculating the amount of butane that can be blended with gasoline in the blending system of this invention. By taking into account the timing of these regulatory changes, for the particular region in which a tank farm is situated, one can more accurately forecast the rate at which butane will be consumed by the tank farm and predict the market demand for butane.

In a similar manner, butane purchases can be timed to account for variability in the Reid vapor pressure of gasoline supplied to a tank farm. There is substantial variability in the gasoline received from commercial pipelines, and this variability can be taken into consideration, based upon the timing of gasoline deliveries to the tank farm, to more accurately forecast butane purchasing decisions as well.

These efficiencies can be especially realized when the butane purchasing decision for more than one tank farm are centralized in one purchaser, who has access to the butane consumption and forecasting data for all of the tank farms. For example, the purchaser of butane for multiple tank farms is able to shift butane supplies among the various tank farms based upon butane consumption rates, the timing of butane purchases, and seasonal variations in butane consumption among various regions. Moreover, because the purchaser controls butane for a number of tank farms, he can negotiate volume discounts and better rates.

Thus, in one embodiment the invention provides a method for optimizing butane purchase decisions for a petroleum products tank farm comprising: (a) in an information processing unit, setting a value for the quantity of butane in a tank at time zero; (b) drawing a butane stream from the tank of butane; (c) blending the butane stream with gasoline for a first interval of time from time zero until time one; (d) monitoring the consumption of butane blended with the gasoline during the first interval of time, and transmitting data regarding the consumption during the first interval of time to the information processing unit; and (e) transforming the consumption data during the first interval of time, and the butane quantity at time zero, to an output of data comprising the butane consumption rate during the first interval of time, and the quantity of butane in the tank at time one.

In another embodiment, the method is performed repetitively, by (a) blending the butane stream with gasoline for a second interval of time from time one until time two; (b) monitoring the consumption of butane blended with the gasoline during the second time interval, (c) transmitting data regarding the consumption during the second time interval to the information processing unit; (d) transforming the consumption data during the second interval of time, and the butane quantity at time one, to an output of data comprising the butane consumption rate during the second interval of time, and the quantity of butane in the tank at time two; and (e) repeating steps (a) through (d) for one or more succeeding intervals of time.

Because the invention is particularly appropriate for the butane blending system of the present invention, in which the butane and gasoline are blended to attain a prescribed vapor pressure level the invention preferably further provides (a) inputting to the information processing unit a plurality of time dependent vapor pressure values; (b) blending the butane and gasoline at ratios that attain the time dependent vapor pressure values; and (c) transforming the time dependent vapor pressure values, and the consumption rate of butane over the first interval of time, to data output comprising a projected rate of butane consumption.

In still another embodiment the information gathered by the information processing unit of the present invention is manipulated to generate reports of butane consumption, gasoline consumption, and the vapor pressure of butane, gasoline, and blended gasoline sold by petroleum tank farms. These reports are typically required by regulatory officials to assure compliance with the law.

It should further be added that the systems of the present invention could be adapted to facilitate blending of gasoline with other fuels that would alter the volatility of the gasoline. Therefore, any of the embodiments and subembodiments discussed herein should be considered also to extend to any such fuel that alters the volatility of gasoline, and which can be mixed with gasoline for retail distribution and use. Such other fuels shall hereinafter be referred to as volatility modifying agents. Such volatility modifying agents preferably only include agents whose primary function is as a source of combustible fuel.

Referring to FIG. 1, this is an illustration of an overview of an exemplary butane blending system that operates at the distribution point. By blending butane at the final opportunity before distribution, at the tank farm, the amount of butane blended with the gasoline can be maximized. In FIG. 1, the main components of the blending system are a butane supply 110, a gasoline supply 115, an analyzing and blending unit 120, and a transport 125. The butane supply 110 typically consists of a large tank of butane with lines for refilling with butane and for drawing off butane vapor. The butane tank will also generally have the appropriate safety valves, pressure gauges and temperature gauges. The butane supply 110 feeds into the analyzing and measuring unit 120 through one or more pipelines.

The gasoline supply 115 typically consists of a large tank or plurality of tanks at the tank farm that supply gasoline to the analyzing and blending unit 120 through pipelines. The gasoline supply may consist of a series of tanks, each providing different grades of gasoline to the analyzing and blending unit 120. Generally, the gasoline tanks are frequently supplying gasoline to the analyzing and blending unit 120 and receiving new supplies of gasoline from various refineries. This frequent turnover of gasoline in the tank makes it difficult to accurately assess the vapor pressure of the gasoline supply in the tank.

Although they are shown as one unit in FIG. 1, the analyzing and blending unit 120 may comprise a separate analyzer and separate blender in alternative embodiments of the invention. Typically, the analyzing and blending unit 120 is triggered when a transport 125 selects a gasoline. The transport 125 connects to a rack which dispenses different grades of gasoline and a transport operator selects a particular grade. The analyzing and blending unit 120 draws samples from the butane supply 110 and the gasoline supply 115 to determine how much butane can be blended with the gasoline. Often, butane will have been blended with the gasoline at earlier stages in the refining and distribution chain. However, the analyzing and blending unit 120 determines the maximum amount of butane that can be blended with the gasoline. The maximum amount of butane corresponds to the maximum volatility of the butane as established by engine requirements or government regulations. Once the analyzing and blending unit 120 determines how much butane to blend, the butane is injected into the gasoline flowing from the gasoline supply 115. The blended combination then flows into the transport 125.

Generally, it takes approximately eight minutes to load a transport with blended gasoline. Significantly, a typical analyzing unit requires six to eleven minutes to extract a sample and determine the vapor pressure. Therefore, taking a sample for every load of gasoline that goes into a transport 125 would be an inefficient use of time and resources. Accordingly, in the preferred embodiment of the present invention, gasoline and butane samples are not measured for every load that goes into a transport 125. Rather, vapor pressure measurements are taken periodically and those measurements are used to control the flow of butane and gasoline during that period of time.

Figure 2:
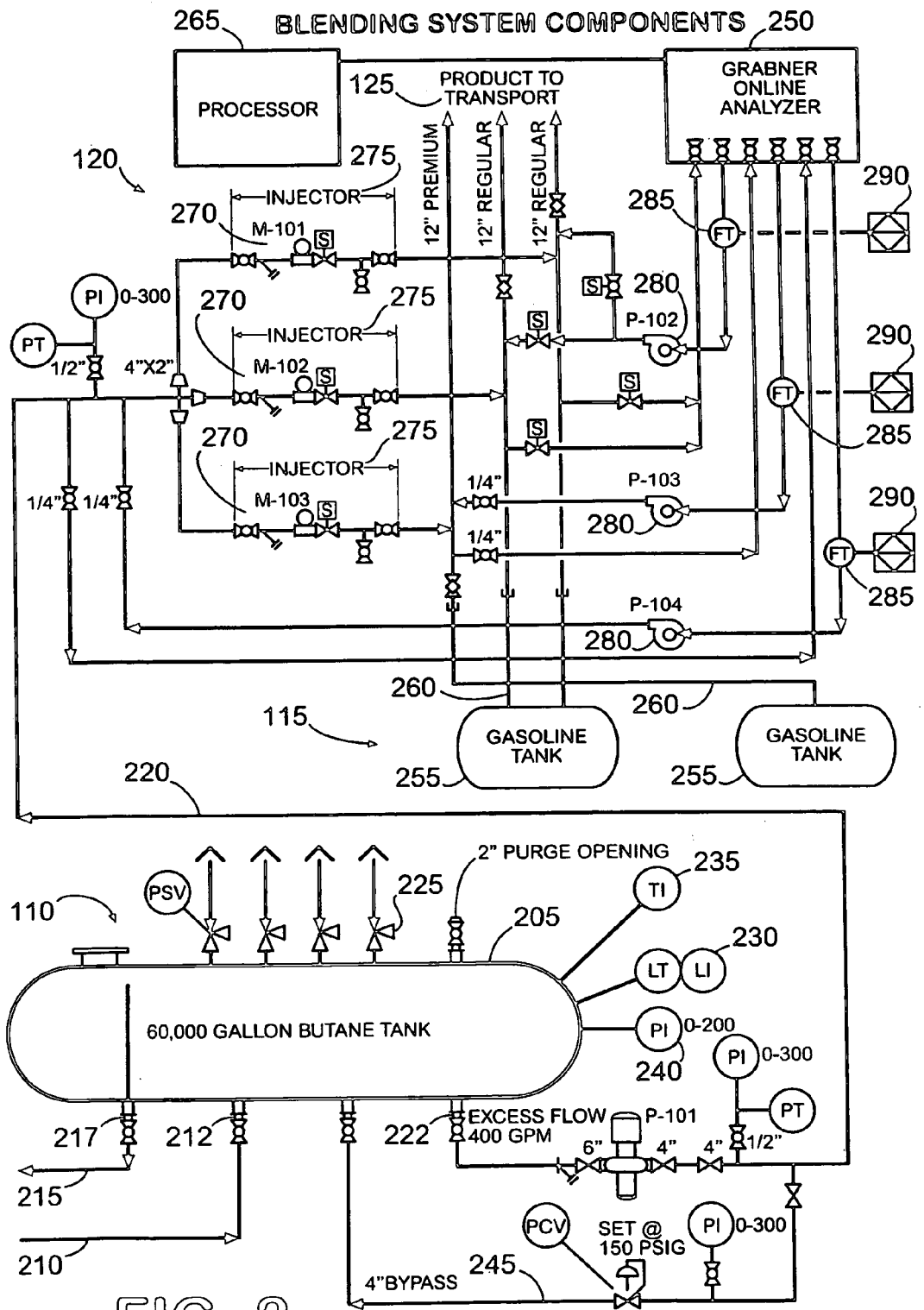
FIG. 2 is a functional block diagram illustrating the architecture and components of an exemplary embodiment of a butane blending system.

FIG. 2 is a schematic diagram illustrating in greater detail the exemplary butane blending system described in FIG. 1. Referring to FIG. 2, the butane supply 110 comprises a butane tank 205, an inlet line 210, a vapor outlet line 215 and an outlet line 220. The butane tank 205 is filled with butane through the inlet line 210. Vapor is released from the butane tank 205 through the vapor outlet line 215. The butane supply 110 may further comprise one or more pressure safety valves 225, a level indicator 230, temperature gauges 235, and pressure gauges 240.

Butane is supplied to the analyzing and blending unit 120 by the outlet line 220. The butane supply 110 may further comprise a bypass line 245 in fluid connection with the butane tank 205 and the outlet line 220. The bypass line 245 is operable for maintaining constant pressure in the outlet line 220.

The gasoline supply 115 is stored in one or more gasoline tanks 255 at the tank farm. Different tanks may contain different grades of gasoline. Gasoline is provided to the analyzing and blending unit 120 through one or more gasoline lines 260.

When a transport arrives at the tank farm, a transport operator selects a particular grade of gasoline for the transport load. Selection of a gasoline grade initiates the analyzing and blending process. A sample of butane is drawn from the outlet line 220 and supplied to the analyzer 250 where the vapor pressure of the butane is measured. Similarly, a sample of gasoline is drawn from the gasoline line 260 and supplied to the analyzer 250 where the vapor pressure of the gasoline is measured. In an alternative embodiment of the invention, the vapor-liquid ratio of the gasoline may be measured instead of, or in conjunction with the vapor pressure, to assess the volatility of the gasoline. Other embodiments of the invention may measure other physical characteristics to determine the volatility of the gasoline. A typical analyzer 250 is the Minivap Online analyzer manufactured by Grabner Instruments. Generally, one or more pumps 280 draw the butane and gasoline samples into the analyzer 250. After the analyzer 250 takes measurements, the samples are returned to the butane outlet line 220 and the gasoline line 260. The flow of the butane and gasoline samples is monitored by flow transmitters 285. Data from the flow transmitters 285 may be communicated to a processor 265 via remote logic units 290 to ensure that there is a sample flow to the analyzer 250.

Once the volatility of the samples is measured, the analyzer 250 sends measurement data for the samples to the processor 265. The processor 265 calculates the amount of butane that can be blended with the gasoline so that the maximum allowable volatility of the gasoline is not exceeded. The processor 265 is coupled to one or more programmable logic controllers 270 that control injectors 275. The injectors 275 are connected to the outlet line 220 and control the flow of butane into the gasoline line 260. The blended gasoline then flows through the gasoline line 260 to the transport 125.

The system provides for accurate and prompt assessment of the volatility of the gasoline. This accurate measurement enables the distributor to blend the maximum allowable amount of butane with the gasoline.

Figure 3:
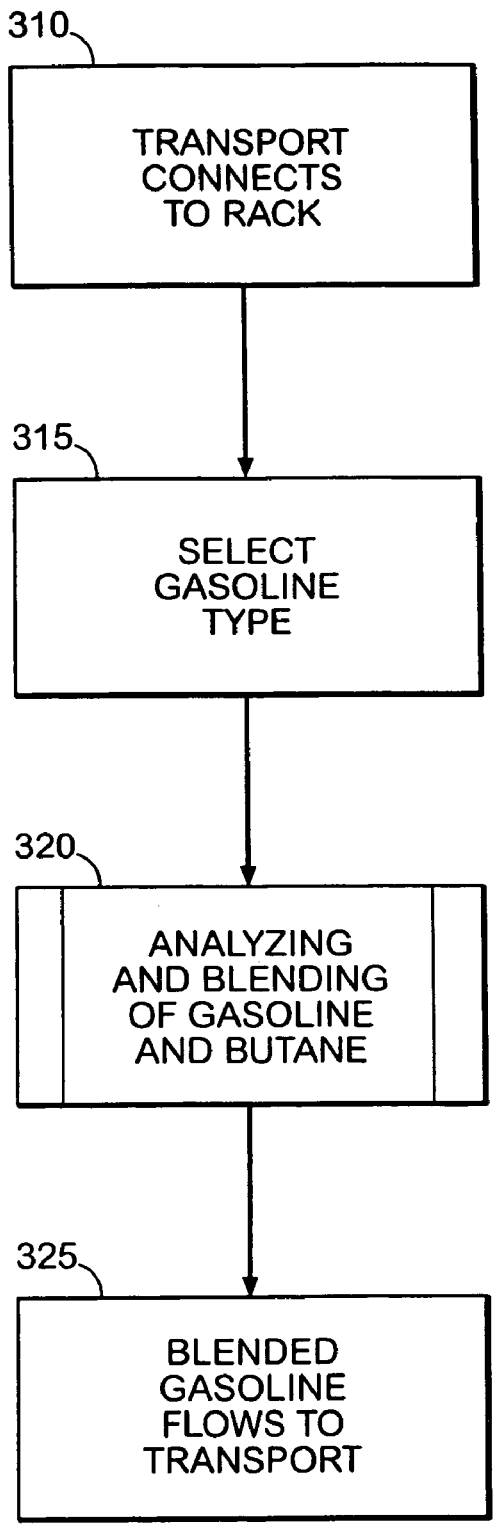
FIG. 3 is a logic flow diagram illustrating an overview of an exemplary butane blending system.

FIG. 3 is a flow chart diagram setting forth an overview of an exemplary blending process. In step 310, the blending process is initiated when a transport 125 connects to a distribution unit. Typically, the transport 125 connects to a mechanism for distributing several grades of gasoline called a rack. In step 315, the transport operator selects the desired grade of gasoline.

In step 320, the analyzing and blending unit 120 draws samples of gasoline and butane to determine the ratio of blending. It is the precision of the present invention that allows a distributor to blend more gasoline than would be possible with the prior art. In step 325, the properly blended butane and gasoline flows to the transport 125.

Figure 4:
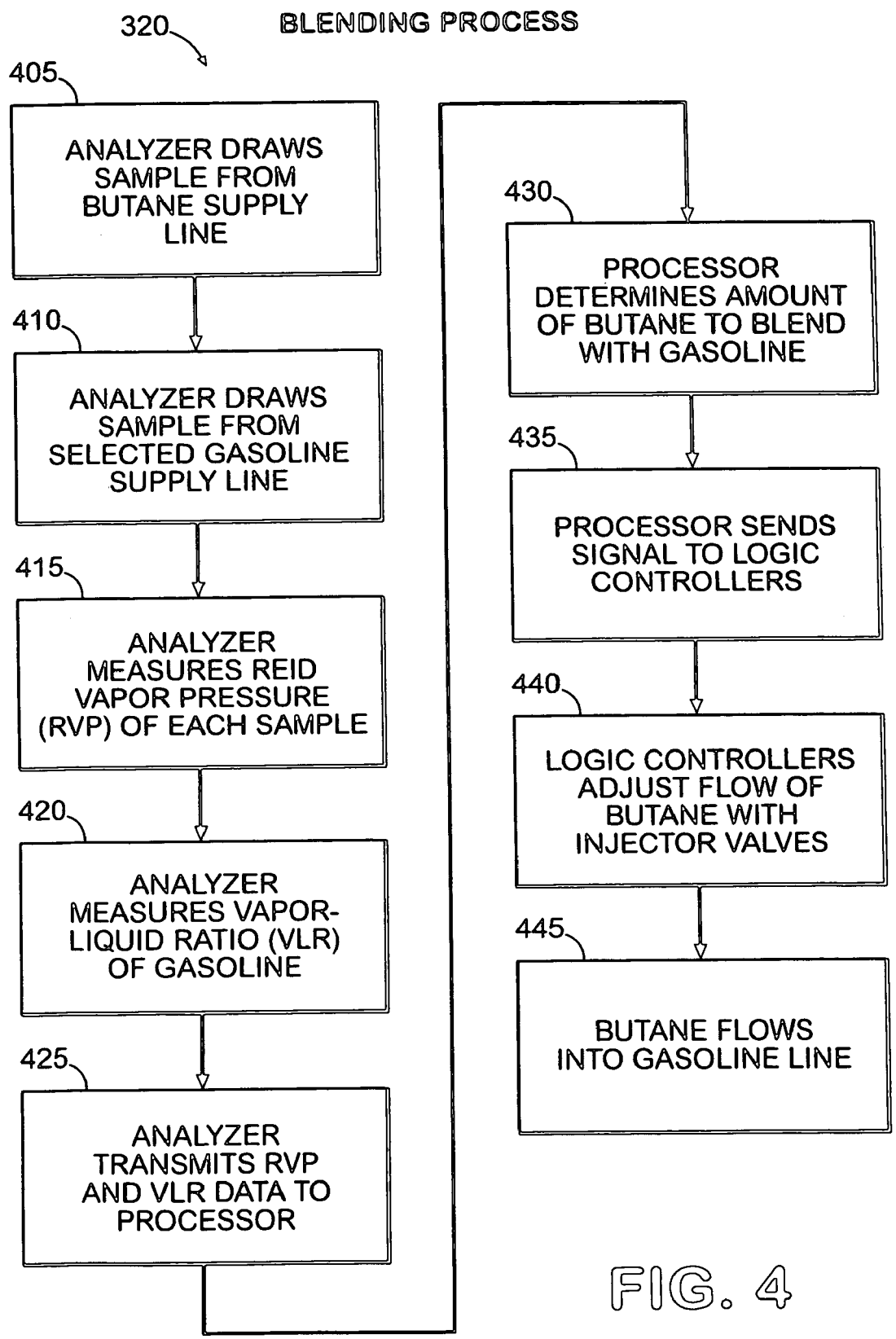
FIG. 4 is a logic flow diagram illustrating operations of a butane blending system constructed in accordance with an exemplary embodiment of the present invention.

FIG. 4 sets forth the operations of the analyzing and blending process, step 320, in greater detail. The method of the present invention supports more accurate and efficient blending than available with prior art. In step 405, the analyzer 250 draws a sample from the butane outlet line 220. In step 410, the analyzer draws a sample from the gasoline line 260. Typically, butane is added to gasoline at other points in the distribution line before reaching the tank farm. However, the amount of butane added often varies. Furthermore, different sources of gasoline are often combined at the tank farm in one large gasoline tank. By positioning the analyzer 250 at the distribution point, the present invention allows a distributor to efficiently and directly measure a sample of gasoline from the volume that will comprise the next load taken by a transport 125. In step 415, the analyzer 250 assesses the volatility of the butane sample and gasoline sample. The volatility of the samples is determined by measuring the vapor pressure of both the butane and the gasoline. The Reid vapor pressure test is generally employed when measuring the volatility of petroleum products. In step 420, the analyzer 250 measures the vapor-liquid ratio of the gasoline. The lower of the vapor-liquid ratio or the Reid vapor pressure of the gasoline will be used in calculating the amount of butane that can be safely blended. Alternative embodiments of the invention may use alternate methods of measuring the volatility of the gasoline and butane.

In step 425, the analyzer 250 transmits the vapor pressure and vapor-liquid ratio data to the processor 265. The processor 265 contains the predetermined limit for gasoline volatility. In step 430, using the analyzer data and the predetermined limit for gasoline volatility, the processor 265 calculates the amount of butane that may be blended with the current volume of gasoline. The processor may also store this data as a record of the amount of butane that is consumed in the blending process. In step 435, the processor sends a signal to the programmable logic controllers 270 coupled to the processor 265. This signal directs the programmable logic controllers to allow a certain amount of butane to be blended with the gasoline. In step 440, the programmable logic controllers 270 control the flow of the butane into the gasoline by adjusting the injectors 275. The injectors 275 typically comprise pneumatic valves and meters that allow a certain amount of butane to pass from the butane outlet line 220 and into the gasoline line 260. In step 445, the blending process is completed with the butane flowing into the gasoline line 260.

Figure 5:
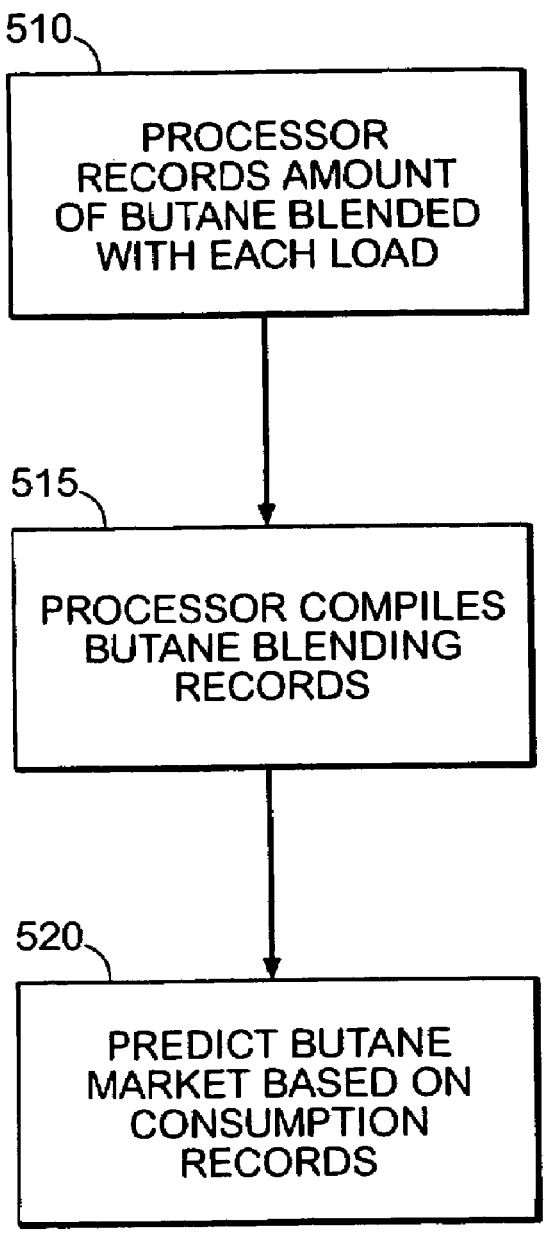
FIG. 5 is a logic flow diagram illustrating an exemplary process for collecting butane consumption data and using it to assess the butane market.

FIG. 5 is a flow chart diagram representing exemplary steps for utilizing the butane consumption data. The butane consumption data can be used to predict future butane demand. As mentioned in step 430, the processor at the tank farm calculates the amount of butane to blend with gasoline. In step 510, the processor 265 records the amount of butane blended with each load of gasoline picked up by a transport 125. In step 0.515, the processor 265 compiles butane consumption records for a specified period of time. In an alternative embodiment of the present invention, a remote processor may communicate with multiple processors located at different tank farms and collect butane consumption records for each distribution point. In step 520, butane market demand is predicted from the consumption records. The butane consumption information may have several uses in regard to the butane market.

In summary, the present invention supports the accurate determination of the volatility of gasoline such that additional butane may be blended with the mixture. The present invention presents advantages over the prior art in that there is a direct and accurate measurement of the gasoline sample that is being loaded into a transport. By measuring the gasoline's volatility at the last opportunity for blending before distribution, the distributor is able to maximize the amount of butane that is blended with the gasoline. Finally, butane consumption information can be easily recorded and examined to learn about the butane market.

Those skilled in the art will appreciate that the invention has a wide range of applications beyond blending merely gasoline and butane. For example, the invention could also be implemented to blend other additives with gasoline. The invention can also be used in conjunction with other types of fuel such as diesel and jet fuel.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A system for blending gasoline and butane comprising:
   a tank of gasoline;
   a tank of butane;
   a blending unit downstream of and in fluid connection with the tank of gasoline and the tank of butane; and
   a rack downstream of and in fluid connection with the blending unit, wherein the rack is adapted to dispense gasoline to a gasoline transport vehicle.

2. The system of claim 1 further comprising a process control unit, wherein the process control unit generates a ratio input signal that controls the ratio of butane and gasoline blended by the blending unit.

3. The system of claim 1 further comprises
   a gasoline vapor pressure sensor operable for measuring the vapor pressure of gasoline upstream of the blending unit; and
   a butane vapor pressure sensor operable for measuring the vapor pressure of butane upstream of the blending unit.

4. The system of claim 3 further comprising a process control unit operable for
   receiving the measured gasoline vapor pressure from the gasoline vapor pressure sensor;
   receiving the measured butane vapor pressure from the butane vapor pressure sensor; and
   calculating a ratio for blending the gasoline and the butane from the measured gasoline vapor pressure and the measured butane vapor pressure.

5. A method for blending gasoline and butane comprising:
   drawing a gasoline stream from a tank of gasoline;
   drawing a butane stream from a tank of butane;
   blending the butane stream and the gasoline stream to form a blend; and
   dispensing the blend to gasoline transport vehicles using a rack.

6. The method of claim 5, further comprising the steps of:
   determining a blend ratio of the butane and gasoline streams that will yield a desired vapor pressure; and
   blending the gasoline stream and butane stream at the blend ratio.

7. The method of claim 6, wherein the blend ratio is determined from a vapor pressure of the gasoline stream and a vapor pressure of the butane stream.

8. The method of claim 5, wherein a vapor pressure of the gasoline stream and a vapor pressure of the butane stream are determined by:
   drawing a sample of gasoline from the gasoline stream;
   measuring the vapor pressure of the sample of gasoline;
   drawing a sample of butane from the butane stream; and
   measuring the vapor pressure of the sample of butane.

9. The method of claim 5, further comprising the steps of:
   measuring the vapor pressure of the blend; and
   generating a report of the vapor pressure of the blend.

10. A system for blending gasoline and a volatility modifying agent comprising:
    a tank of gasoline;
    a tank of the volatility modifying agent;
    a blending unit downstream of and in fluid connection with the tank of gasoline and the tank of the volatility modifying agent; and
    a rack downstream of and in fluid connection with the blending unit, wherein the rack is adapted to dispense gasoline to a gasoline transport vehicle.

11. The system of claim 10 further comprising a process control unit, wherein the process control unit generates a ratio input signal that controls the ratio of the volatility modifying agent and the gasoline blended by the blending unit.

12. The system of claim 11 wherein the ratio input signal is derived from a calculation of the ratio of the volatility modifying agent and the gasoline that will yield a desired vapor pressure.

13. A method for blending gasoline and a volatility modifying agent comprising:
    drawing a gasoline stream from a tank of gasoline;
    drawing a volatility modifying agent stream from a tank of the volatility modifying agent;
    blending the volatility modifying agent stream and the gasoline stream to form a blend; and
    dispensing the blend to a gasoline transport vehicle at a rack.

14. The method of claim 13, further comprising:
    determining a blend ratio of the volatility modifying agent stream and the gasoline stream that will yield a desired vapor pressure; and
    blending the volatility modifying agent stream and the gasoline stream at the blend ratio.

15. The method of claim 14, wherein the blend ratio is determined from a vapor pressure of the gasoline stream and a vapor pressure of the volatility modifying agent stream.

16. The method of claim 13, further comprising the steps of:
    determining the volatility of the blend; and
    generating a report comprising the volatility of the blend.

17. A computer-implemented method for blending a butane stream with a gasoline stream comprising the steps of:
    receiving a first measurement indicating a vapor pressure of the gasoline stream;
    receiving a second measurement indicating a vapor pressure of the butane stream;
    calculating a blend rate at which the butane stream can be blended with a gasoline stream; and
    transmitting an instruction to a programmable logic controller for adjusting the butane stream to the calculated blend rate for blending with the gasoline stream and distributing at a rack.

18. The computer-implemented method of claim 17, wherein the blend rate is based on a predetermined vapor pressure for the blended gasoline and butane.

19. The computer-implemented method of claim 17, wherein the blend rate is associated with the rack that distributes the blended gasoline stream and butane stream.

20. The computer-implemented method of claim 17, wherein the blend rate is stored to generate a report of butane consumption.

21. The computer-implemented method of claim 17, wherein the blend rate is used to predict butane consumption over a period of time.

22. The computer-implemented method of claim 17, further comprising the steps of:
    receiving a third measurement indicating a vapor pressure of the blend of the gasoline stream and the butane stream; and
    generating a report comprising the third measurement.

23. A computer-readable medium having computer-executable instructions for performing the steps recited in claim 17.

24. A computer-implemented method for blending a volatility modifier stream and a gasoline stream comprising the steps of:
   receiving a first measurement indicating a vapor pressure of the gasoline stream;
   receiving a second measurement indicating a vapor pressure of the volatility modifier stream;
   calculating a blend rate at which the volatility modifier stream can be blended with the gasoline stream; and
   transmitting an instruction to a programmable logic controller for adjusting the volatility modifier stream to the calculated blend rate for blending with the gasoline stream and distributing at a rack.

25. The computer-implemented method of claim 24, wherein the blend rate is based on a predetermined vapor pressure for the blended gasoline and volatility modifier.

26. The computer-implemented method of claim 24, wherein the blend rate is associated with the rack that distributes the blended gasoline and volatility modifier.

27. The computer-implemented method of claim 24, wherein the blend rate is stored to generate a report of volatility modifier consumption.

28. The computer-implemented method of claim 24, wherein the blend rate is used to predict consumption of the volatility modifier over a period of time.

29. The computer-implemented method of claim 24, further comprising the step of receiving a third measurement indicating a vapor pressure of the blend of the gasoline stream and the volatility modifier stream.

30. A computer-readable medium having computer-executable instructions for performing the steps recited in claim 24.

31. A computer-implemented method for blending a butane stream and a gasoline stream comprising the steps of:
   receiving a first measurement indicating a vapor pressure of the gasoline stream;
   calculating a blend rate at which the butane stream can be blended with the gasoline stream;
   transmitting an instruction to a programmable logic controller for adjusting the butane stream to the calculated blend rate for blending with the gasoline stream and distributing at a rack; and
   receiving a second measurement indicating a vapor pressure of the blended gasoline stream and butane stream.

32. The computer-implemented method of claim 31, further comprising the step of generating a report comprising the second measurement.

33. The computer-implemented method of claim 32, wherein the report further comprises the first measurement.

* * * * *